United States Patent [19]

Levy

[11] Patent Number: 5,430,248
[45] Date of Patent: Jul. 4, 1995

[54] ENCLOSURE FOR AN ELECTRICAL TERMINAL BLOCK INCLUDING AN IMPROVED ENCLOSURE COVER

[75] Inventor: Sidney Levy, Belle Mead, N.J.

[73] Assignee: Thomas & Betts Corporation, Memphis, Tenn.

[21] Appl. No.: 956,150

[22] Filed: Oct. 5, 1992

[51] Int. Cl.$^6$ ............................................. H05K 5/00
[52] U.S. Cl. ........................................ 174/50; 220/335
[58] Field of Search ............................ 174/50, 59, 60; 220/3.8, 305, 335, 344

[56] References Cited

U.S. PATENT DOCUMENTS

| | | | |
|---|---|---|---|
| 2,206,848 | 7/1940 | McAvoy | 220/344 X |
| 2,967,638 | 1/1961 | Burman, Jr. | 220/335 X |
| 4,895,271 | 1/1990 | Desjardins et al. | 220/335 |
| 4,971,220 | 11/1990 | Kaufman et al. | 220/335 |
| 5,101,079 | 3/1992 | Rodrigues et al. | 174/65 R |

*Primary Examiner*—Leo P. Picard
*Assistant Examiner*—David Tone
*Attorney, Agent, or Firm*—Robert M. Rodrick

[57] ABSTRACT

An enclosure for an electrical terminal block includes a housing having a back wall and projecting side walls which form a bounded chamber. The chamber accommodates an electrical terminal block. A cover is hingedly attached to the housing and may be locked thereto to protect the terminal block housed therein. The cover and the housing are attached in such a manner so that if the cover is not properly locked to the housing, the cover will pop open providing a visual indication to the installer that the cover has not been locked properly to the housing.

4 Claims, 2 Drawing Sheets

ENCLOSURE FOR AN ELECTRICAL TERMINAL BLOCK INCLUDING AN IMPROVED ENCLOSURE COVER

FIELD OF INVENTION

The present invention relates to an enclosure for an electrical terminal block. More particularly, the present invention relates to an enclosure having a hinged cover where the cover remains in the opened position until the cover is securely locked to the enclosure.

BACKGROUND OF THE INVENTION

In the telecommunications industry, electrical wires running to a subscriber's premises are typically connected to outdoor telecommunications cable by use of a terminal device referred to as a terminal block. These devices are usually supported, adjacent utility poles in overhead applications and in outdoor pedestals in underground applications. Being outdoors, the terminal blocks are typically housed in an enclosure. The enclosure protects the terminal block from exposure to the outdoor elements. A typical terminal block enclosure includes a housing having an interior compartment which supports the terminal block and a cover which allows access to the interior of the compartment for installation and repairs. The cover closes the housing to prevent entry of water, debris, animals, insects and the like. The cover and the housing include locking elements which permit it the cover to be securely latched or locked to the enclosure. In order to assure adequate protection from the elements, the cover must be properly locked to the enclosure when the installer has completed installation or repairs. Failure to properly latch the cover to the housing may result in the cover subsequently opening due to wind or vibration. After completion of repairs or installation, the installer closes the cover and actuates the latch. However, if the latch does not catch, the cover will initially remain closed. After the installer has left the area, the cover will, in time open, exposing the terminal block to the elements.

It is desirable to provide a simple and effective method to assure that the cover is properly latched to the housing which houses a telecommunications terminal block.

It is also desirable to provide a visual indication to the installer that the cover has not been effectively latched to the housing so that proper latching can take place.

SUMMARY OF THE INVENTION

It is an object of the present invention to provide an enclosure for an electrical terminal block which may be closed by a cover and when closed, protects the terminal block from the adverse effects of outdoor exposure.

It is a further object of the present invention to provide an electrical enclosure for housing a terminal block which includes a housing and cover which closes the housing. The cover and the housing provide a visual indication that the cover has not been securely fastened to the housing so that an installer does not leave the cover ajar.

In the efficient attainment of these and other objects, the present invention provides an enclosure for electrical connectors. The enclosure comprises a housing having an interior compartment which accommodates the connectors and an open face for accessing the interior compartment. A cover is hingedly attached to the housing for movable positioning over the open face of the housing for covering the open face. Interference means is positioned between the cover and the housing to provide resistance to the movable positioning of the cover over the open face of the housing. The resistance may be overcome by application of manual force to thereby cover the open face of the housing.

As particularly shown by way of a preferred embodiment herein, the present invention provides a hinge element between the cover and the housing for hingedly connecting the cover to the housing. The hinge element includes a stop member positioned between the cover and the housing for providing the resistance to the movement of the cover. Locking means is provided to lock the cover to the housing after the resistance provided by the stop element is overcome.

Figure 1:
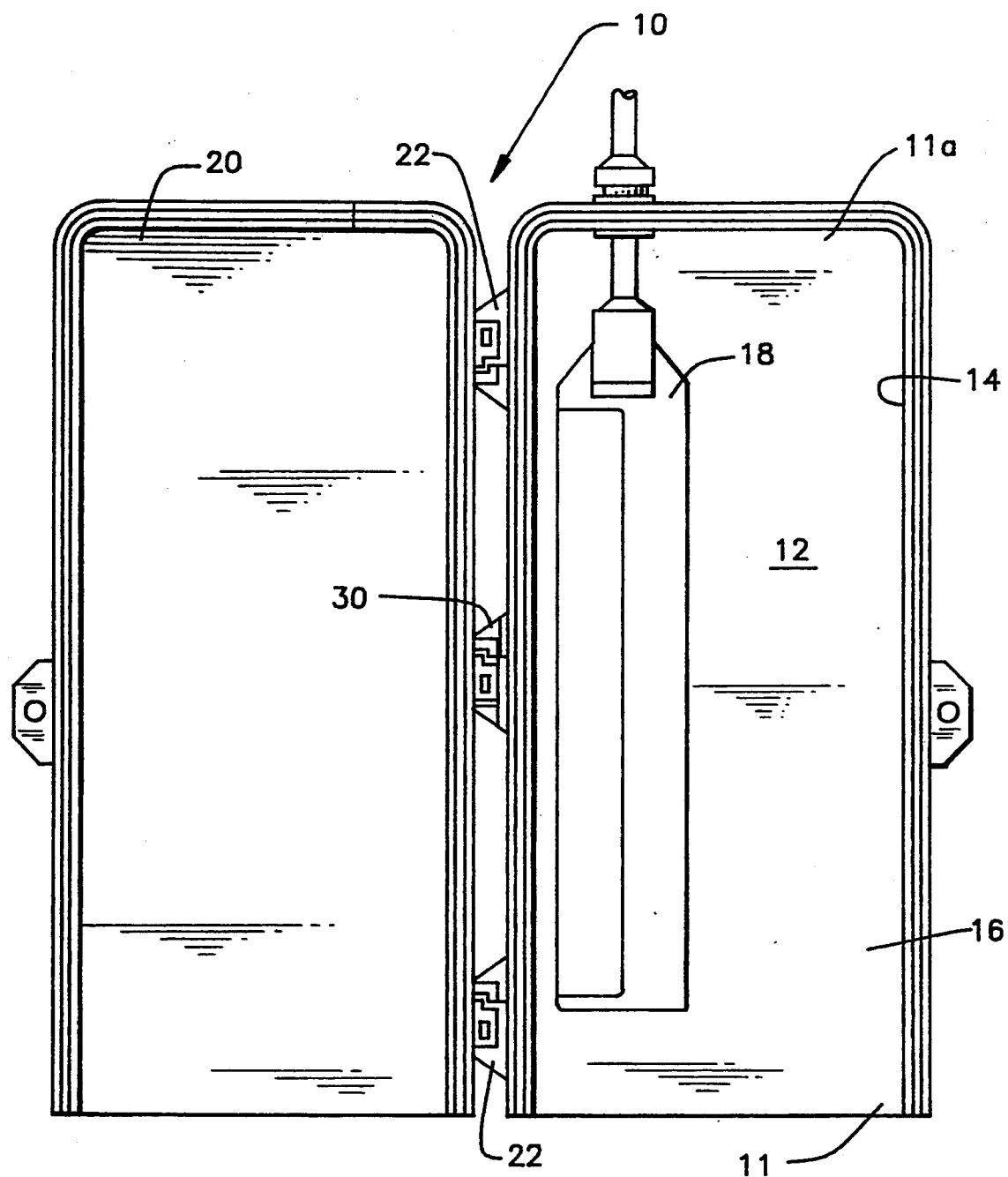
FIG. 1 shows in plan view the enclosure of the present invention including an electrical terminal block mounted therein.
Figure 3:
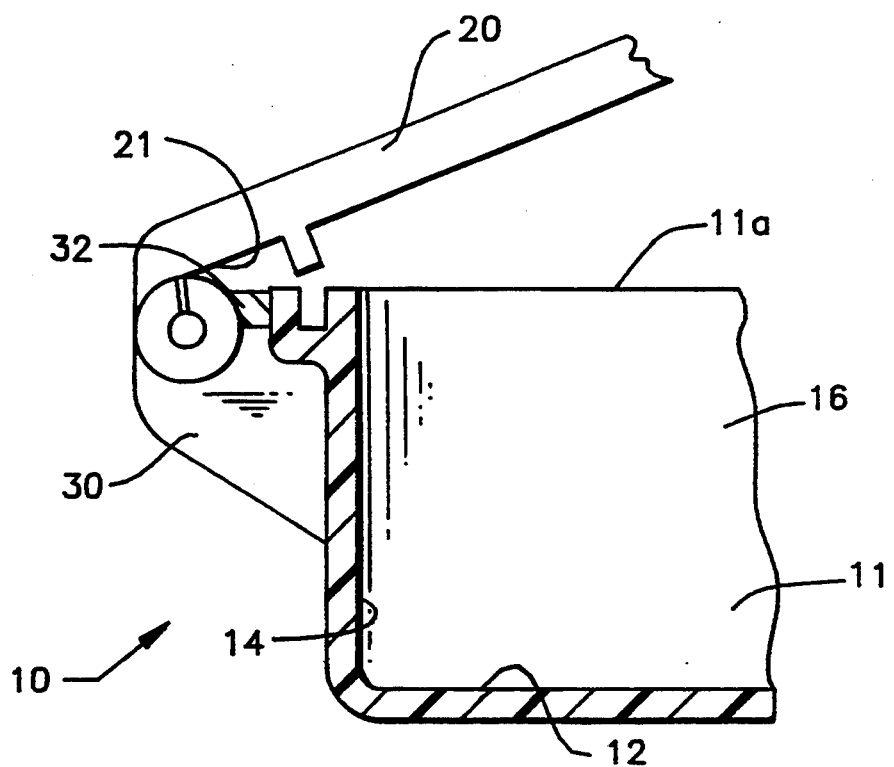
FIG. 3 is a side view partially in section, of the enclosure of the present invention including the details of the hinge shown in FIG. 2 taken through the lines III—III thereof.

DETAILED DESCRIPTION OF THE PREFERRED EMBODIMENT:

Referring to FIGS. 1 and 3, electrical enclosure 10 of the present invention is typically a box-type member formed of molded plastic. Enclosure 10 includes a lower housing 11 which is formed to have a flat, planar back wall 12 and a substantially continuous side wall 14 projecting upwardly therefrom. Back wall 12 and side wall 14 define a bounded interior compartment 16 which is designed to support therein electrical terminal block 18 (FIG. 1). Electrical terminal block 18 is of the type shown and described in U.S. Pat. No. 4,993,966.

Enclosure 10 further includes a plate-like cover 20 hingedly attached to side wall 14 by cooperating hinge elements 22. Cover 20 may be hingedly moved between an open and closed position. The open position permits access to the terminal block 18 housed in compartment 16 for installation or repair. The closed position is provided to completely enclose housing 11 protecting the terminal block 18 from adverse outdoor conditions.

The cover 20 may be latched to the housing 11 with the aid of cooperative locking members 24 and 26, respectively positioned on housing 11 and cover 20. Locking members 24 and 26 are of the type which are conventionally known and used in a wide variety of applications to lock covers or lids to enclosures or the like. Locking elements 24 and 26 may be of the type where locking element 24 includes a spring loaded pin device which may engage a corresponding recess in locking element 26. The pin type device may be turned or rotated to lock within the recess of locking element 26 to secure the cover 20 to housing 11. Release of locking elements 24 and 26 is typically accomplished by rotating the pin type device in the opposite direction. Locking elements 24 and 26 may be actuated by hand or by use of a suitable tool.

Cover 20 is designed to enclose the open face 11a of housing 11 by hingedly moving cover 20 over open face 11a. Locking elements 24 and 26 maintain cover 20 in closed position. However, if locking elements 24 and 26 are not properly latched, cover 20 will not be locked to housing 11. Since enclosure 10 of the type shown herein is typically mounted in a vertical position outdoors, wind or vibration could cause the cover 20 to swing open. If this occurs after the installer has left the area, cover 20 will remain in an open position exposing terminal block 18 to the adverse effects of the outdoor elements. Accordingly, the present invention provides an indication that cover 20 has not been properly latched to housing 11.

Figure 2:
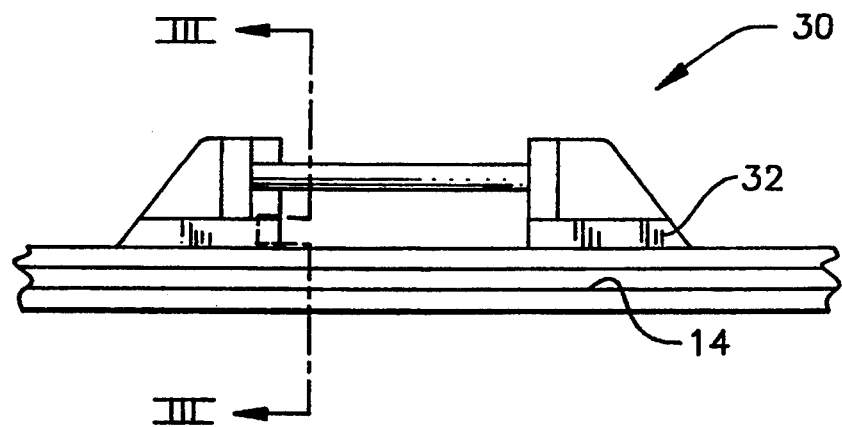
FIG. 2 is a enlarged detailed showing of a hinge of the enclosure of FIG. 1.

As shown in FIG. 1, one or more of hinge elements 22 may be modified so as to prevent full closing of cover 20 if locking element 24 and 26 are not properly latched together. Hinge 30, which is shown as the central hinge in FIG. 1, is shown in further detail in FIGS. 2 and 3. Hinge 30 is formed on side wall 14 of housing 11 and is of conventional construction so as to accommodate a mating hinge in cover 20 (FIG. 1). Hinge element 30 has been modified to include a stop member 32 formed of excess material molded between hinge 30 and side wall 14 of housing 11. This stop member 32 provides resistance against the closure of cover 20 over the open face 11a of housing 11.

As shown in FIG. 3, the proximal end 21 of cover 20 will engage stop member 32 upon closing cover 20. The cover 20 will not fully close because of the contact between proximal end 21 and stop member 32. However, since cover 20 is formed of relatively flexible plastic, the resistance provided by stop member 32 may be overcome by forcing the cover closed over open face 11a. Proper latching of locking elements 24 and 26 will maintain the cover in closed position. However, if the cover 20 is not properly latched to housing 11, the resistance provided by stop member 32 will force the cover to "pop open" thereby providing an immediate visual indication to the installer that the cover 20 has not been properly latched to housing 11. The installer may then latch the cover to housing 11 to assure that terminal block 18 is adequately protected.

While a simple approach to providing resistance to the closure of cover 20 with respect to housing 11 is shown herein by way of providing excess material at hinge 30 during the molding process, it is, of course, contemplated that other devices may be employed. Springs of various construction may be interposed between cover 20 and housing 11 to provide the same "pop up" feature where the cover 20 is not properly latched to housing 11. The bias of the spring may be overcome by forcing the cover over housing 11. Use of a spring, while requiring an additional component, would eliminate the need to rely on the inherent flexibility of the plastic cover. This would permit the "pop up" feature to be employed in metallic enclosures.

Various changes to the foregoing described and shown structures would now be evident to those skilled in the art. Accordingly, the particularly disclosed scope of the invention is set forth in the following claims.

I claim:

1. An enclosure for electrical connectors comprising:
   a housing having an interior compartment for accommodating said electrical connectors and an open face for accessing said interior compartment;
   a cover hingedly attached to said housing, said cover including a flexible expanse adapted for movable positioning over said open face of said housing for covering said open face;
   said housing and said cover including cooperative inflexible hinge elements providing hinged movable securement of said cover to said housing.
   an inflexible stop member positioned between said cover and said housing, said stop member providing non-deformable resistance to said movable positioning of said cover to resist said covering of said open face;
   said resistance being overcome by application of manual force to thereby flex said flexible cover expanse to cover said open face with said cover; and
   cooperative locking elements respectively located on said housing and said cover, said Cooperative locking elements being adapted to maintain said flexed cover in a closed position relative to said housing.

2. An enclosure of claim 1 wherein said stop member is positioned on said housing adjacent said cooperative hinge elements for providing said resistance to said hinged movement of said cover.

3. An enclosure of claim 2 wherein said housing and said cover are formed from molded plastic.

4. An enclosure of claim 3, wherein said housing and said stop member are formed as a one-piece molded member.

* * * * *